(12) United States Patent  (10) Patent No.: US 7,176,262 B2
Stere et al.  (45) Date of Patent: Feb. 13, 2007

(54) HYDROGENATED VINYL-POLYBUTADIENES

(75) Inventors: Cristina Stere, Leverkusen (DE); Werner Obrecht, Moers (DE)

(73) Assignee: Bayer Aktiengesellschaft, Leverkusen (DE)

( * ) Notice: Subject to any disclaimer, the term of this patent is extended or adjusted under 35 U.S.C. 154(b) by 239 days.

(21) Appl. No.: 10/854,385

(22) Filed: May 26, 2004

(65) Prior Publication Data

US 2004/0242797 A1 Dec. 2, 2004
US 2005/0197466 A9 Sep. 8, 2005

(30) Foreign Application Priority Data

May 30, 2003 (DE) ................................ 103 24 304

(51) Int. Cl.
*C08C 19/02* (2006.01)
*C08F 8/04* (2006.01)

(52) U.S. Cl. ...................... 525/338; 525/339; 525/232; 525/333.2; 526/335

(58) Field of Classification Search ................ 526/335; 525/333.2, 338, 339, 232
See application file for complete search history.

(56) References Cited

U.S. PATENT DOCUMENTS 3,600,311 A * 8/1971 Naiman et al. ................. 585/9
3,959,161 A * 5/1976 Dawans et al. ................ 585/10
4,025,478 A 5/1977 Jurrens ..................... 260/27 R
4,187,360 A * 2/1980 Peters .......................... 525/339
4,238,202 A 12/1980 Trepka et al. ................... 44/62
5,030,779 A 7/1991 Hoxmeler et al. .......... 585/262
5,405,911 A 4/1995 Handlin, Jr. et al. ........ 525/139
2003/0125475 A1 7/2003 Sasagawa et al. ....... 525/332.8

FOREIGN PATENT DOCUMENTS

CA 1 188 045 5/1985

* cited by examiner

*Primary Examiner*—Ling-Sui Choi
(74) *Attorney, Agent, or Firm*—Jennifer R. Seng

(57) ABSTRACT

The hydrogenated vinyl-polybutadienes according to the present invention have degrees of hydrogenation of from 20 to 100%, Mooney viscosities in the range of from 10 to 150 Mooney units (ML 1+4/100° C.), glass transition temperatures ($T_g$) of $\leq -57°$ C. and enthalpies of fusion ($\Delta H$) of $\leq 30$ J/g and having a microstructure with a) from 0 to 44 wt. % 1,2-vinyl-butadiene units of the formula

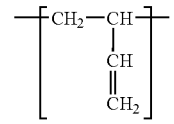

b) from 20 to 64 wt. % 1,2-butylene units of the formula

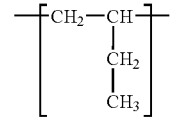

c) from 0 to 60 wt. % 1,4-butenylene units of the formula

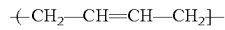

and d) from 0 to 60 wt. % 1,4-butylene units of the formula

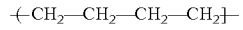

are outstandingly suitable for the production of rubber molded bodies of any kind, especially for the production of industrial rubber articles and of tires and tire components. The rubber molded bodies produced from the hydrogenated vinyl-polybutadienes according to the present invention have good resistance to ageing and good elasticity at low temperatures.

5 Claims, No Drawings

HYDROGENATED VINYL-POLYBUTADIENES

FIELD OF THE INVENTION

The present invention provides hydrogenated vinyl-polybutadienes having degrees of hydrogenation of from 20 to 100%, which are prepared by hydrogenation of vinyl-polybutadienes in a known manner. The hydrogenated vinyl-polybutadienes according to the present invention are distinguished by low glass transition temperatures and low enthalpies of fusion. The hydrogenated vinyl-poly-butadienes according to the present invention are highly resistant to ageing and have high elasticity even at low temperatures. They are therefore suitable for the production of rubber molded bodies of any kind, such as industrial rubber articles as well as tires and tire components, in which good resistance to ageing and good elasticity at low temperatures are required, as well as for the rubber modification of thermoplastics and duroplastics.

BACKGROUND OF THE INVENTION

Hydrogenated polybutadienes having a high vinyl content of from 85 to 100% are known from European Patent Application EP-A 0 024 315. The hydrogenated vinyl-polybutadienes described are distinguished by high ozone resistance but have the disadvantage that the elasticity of the products at lower temperatures leaves something to be desired owing to their relatively high glass transition temperatures and enthalpies of fusion.

Hydrogenated polybutadienes having a vinyl content of $\geq 20$ wt. % and less than 40 wt. % and a degree of hydrogenation of 85 and above are also known from European Patent Application EP-A 1 258 498. The hydrogenated polymers described therein have a high degree of crystallization with good mechanical properties and good resistance to heat and weathering, but they have the disadvantage that their elasticity leaves something to be desired especially at low temperatures owing to their highly crystalline nature.

U.S. Pat. No. 4,025,478 discloses melt adhesive preparations based on hydrogenated vinyl-polybutadiene with a vinyl content from 50 to 95%, it is possible for the vinyl content to be adjusted to a double bond content of less than 15%, preferably less than 10%, by hydrogenation. In order to be suitable for the melt adhesive preparation, the hydrogenated vinyl-polybutadienes must have a Mooney viscosity of <10.

The effect of the Mooney viscosity is discussed in the examples of U.S. Pat. No. 4,025,478, specifically, Table 1 and Table 2, where a virtually completely hydrogenated vinyl-polybutadiene having a Mooney viscosity of 27 is used as comparison.

U.S. Pat. No. 3,959,161 describes lubricant compositions which possess inter alia as one component a small amount of a hydrogenated polybutadiene that has molecular weights in the range of from 20,000 to 300,000 and has a vinyl content of from 65 to 85%. The degree of hydrogenation of those products is from 75 to 100%. In order to be able to be effective as an additive in lubricant compositions and to be able to improve the viscosity index of those lubricant compositions, which consist substantially of lubricating oil, the hydrogenated vinyl-polybutadienes should have a particular molecular weight range, which is generally from 30,000 to 200,000. For the application of such hydrogenated polymers, for example in the manufacture of tires or tire components, such molecular weights, or the Mooney viscosities associated therewith, are too low to obtain tires or tire components having good physical properties.

U.S. Pat. No. 5,405,911 discloses hydrogenated polybutadienes which have a vinyl content of from 30 to 70% and, moreover, have terminal functional groups, such as hydroxyl groups. As a result of the terminal fictionalization, for example with hydroxyl groups, products having a comparatively low viscosity are obtained with the given vinyl contents and the given degree of hydrogenation of over 90%.

These products are suitable especially as coating compositions, sealing compositions and binders. An application for solid rubber molded bodies, e.g. for tires or tire components, is not described.

The object of the present invention was to provide hydrogenated poly-vinylbutadienes which are suitable for the production of solid molded bodies of any kind, especially for the production of tires and tire components, which have high resistance to oxygen and ozone and which have high elasticity at low temperatures. The hydrogenated poly-vinylbutadienes according to the present invention are also suitable for improving the impact resistance of thermoplastics when the latter are blended with the hydrogenated poly-vinylbutadienes according to the invention.

SUMMARY OF THE INVENTION

The present invention provides hydrogenated vinyl-polybutadienes having degrees of hydrogenation of from 20 to 100%, Mooney viscosities in the range of from 10 to 150 Mooney units (ML 1+4/100° C.), glass transition temperatures ($T_g$) of $\geq -57°$ C. and enthalpies of fusion ($\Delta H$) of $\geq 30$ J/g, which have a microstructure of a) from 0 to 44 wt. % vinyl-ethylene units of the formula

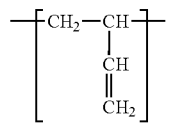

b) from 20 to 64 wt. % 1,2-butylene units of the formula

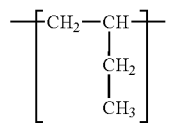

c) from 0 to 60 wt. % 1,4-butenyl units of the formula

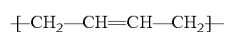

and d) from 0 to 60 wt. % 1,4-butylene units of the formula

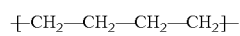

Excluded from the hydrogenated vinyl-polybutadienes according to the invention is, according to U.S. Pat. No. 4,025,478, a hydrogenated vinyl-polybutadiene having a trans content of 4.7%, a vinyl content of 0.2%, a Mooney viscosity of 27 and a molecular weight ratio $M_w/M_n \times 10^{-3}$ of 291/96, as disclosed in Table 1 under No. 3.

DETAILED DESCRIPTION OF THE INVENTION

Preference is given according to the present invention to hydrogenated vinyl-polybutadienes which have a degree of hydrogenation of from 20 to 100% and Mooney viscosities in the range of from 10 to 150, glass transition temperatures of $\geq -80°$ C. and enthalpies of fusion of from 0 to 30 J/g and which have a microstructure of
a) from 0 to 25% vinyl-ethylene,
b) from 20 to 45% 1,2-butylene units,
c) from 0 to 55% 1,4-butenylene units and
d) from 0 to 55% 1,4-butylene units.

The hydrogenated vinyl-polybutadienes according to the present invention have molecular weights (Mn) in the range of from 20,000 to 500,000, preferably from 60,000 to 300,000.

The molecular weight ratio $M_w/M_n$ has values in the range of from 1 to 20, preferably from 1 to 10.

The hydrogenated vinyl-polybutadienes according to the present invention having the above-mentioned specification are obtained in a known manner by hydrogenation of corresponding vinyl-polybutadienes that have a vinyl content of from 40 to 64 wt. %, preferably from 45 to 60 wt. %, and a content of 1,4-butenyl of from 36 to 60 wt. %, preferably from 40 to 55 wt. %.

The vinyl-polybutadienes suitable as starting materials for the hydrogenation are prepared in a known manner by Ziegler-Natta polymerization or by ionic polymerization in solvents suitable for that purpose and with the addition of known reagents for adjusting the vinyl content and also by addition of appropriate regulators and coupling agents for adjusting the molecular weight and the molecular weight distribution.

The preparation of the vinyl-polybutadienes as starting materials for the subsequent hydrogenation is described in greater detail, for example, in the following literature: H. L. Hsieh and R. Quirk "Anionic Polymerization, Principles and Practical Applications" Marcel Dekker Inc. New York, Basle, 1966, pages 197–235.

By suitably selecting the initiators for the polymerization, the solvent, the molecular weight regulator and the reagents for adjusting the vinyl content it is possible to obtain vinyl-polybutadienes which have the above-mentioned vinyl content and butenyl content and which have a glass transition temperature of $\geq -80°$ C., preferably $\geq -90°$ C., enthalpies of fusion of from 0 to 40 J/g, preferably from 0 to 30 J/g, and Mooney viscosities ML1+4 (100° C.) of from 10 to 150 Mooney units, preferably from 10 to 120 Mooney units.

A preferred form for the preparation of vinyl-polybutadienes having the above-mentioned physical parameters is affected, for example, by the polymerization of butadiene in the presence of butyllithium as initiator and in the presence of cyclohexane as solvent. The amount of initiator used is approximately from 0.05 to 250 milliequivalents of metal, based on 100 g of butadiene used.

Because the vinyl content of approximately from 10 to 12% that is established in the anionic polymerization of butadiene in inert non-polar solvents suitable therefore (e.g. hexane, cyclohexane) may not be sufficient for the preparation of the polymers according to the present invention, it is necessary to adjust the desired vinyl contents by the addition of suitable additives or randomizers. The suitable additives or randomizers are likewise known. Mention may be made, for example, of aminic compounds (e.g. U.S. Pat. No. 3,985,829), ethers or the alcoholates of alkali metals. Reference is made in this connection, for example, to DE-A 10 217 800.

The reagents for adjusting the vinyl content are usually used in molar ratios of from 1:1 to 80:1, preferably from 1:1 to 40:1 (additive/initiator).

For adjusting the molecular weight and the molecular weight distribution, appropriate regulators and appropriate coupling agents are added during the polymerization. A preferred regulator is 1,2-butadiene. Preferred coupling agents are derived from silicon compounds and tin compounds and are described, for example, in H. L. Hsieh and R. Quirk "Anionic Polymerization, Principles and Practical Applications" Marcel Dekker Inc. New York, Basle, 1966, pages 197–235. Other coupling agents, such as multi-vinyl compounds, e.g. divinylbenzene, are also known (e.g. U.S. Pat. No. 4,107,236).

The polymerization reaction is carried out under inert conditions (exclusion of water, oxygen and carbon dioxide) in order to avoid deactivation of the initiator and/or of the live polymers.

Polymerization temperatures of approximately from −30 to 180° C. and reaction times of approximately from 0.1 to 10 hours are usual. The polymerization can be carried out either batchwise or continuously. The pressure during the polymerization is set in the range of approximately from 0.1 MPa to 5 MPa. The polymerization conversions are approximately from 50 to 100%.

The polymerization is stopped by additives such as water, alcohols, phenols and/or acids. In the case of "in situ hydrogenation", the polymerization is preferably not stopped, because the necessary amount of hydrogenation catalyst can be minimized in that manner.

Before the hydrogenation reaction, unreacted monomer is removed from the reaction mixture. Where the hydrogenation is carried out "in situ", steam is preferably not used for that purpose, but unreacted butadiene is "flashed" without previous cooling of the reaction mixture.

Hydrogenation of the resulting vinyl-polybutadiene was carried out in a manner likewise known using known hydrogenation catalysts. The catalysts are known to the person skilled in the art and are described, for example, in U.S. Pat. Nos. 3,113,986; 3,333,024; 3,700,633; 4,107,236; 3,700,633; 3,595,942; 4,028,485; 3,135,716; 3,150,209; 3,496,154; 3,498,960; 4,145,298; 4,238,202; 3,231,635; 3,265,765; 3,322,856; 5,030,779; 3,541,064; 3,644,588; FR-A 1581146; FR-A 2393608; WO-A 9314130. Preferably, the hydrogenation is carried out using a nickel salt in combination with an aluminum alkyl (see in this connection e.g. EP-A 1 258 498).

Suitable nickel salts include inter alia: Ni n-octanoate, Ni acetylacetonate, Ni 2-ethylhexanoate and/or Ni versatate. Aluminum alkyls are, for example: triisobutylaluminum, trimethylaluminum, triethylaluminum and/or tri-n-propylaluminum. Triethylaluminum and Ni n-octanoate are preferred.

The molar ratio of Al alkyl to Ni salt is approximately from 1:1 to 10:1, preferably from 2:1 to 5:1.

There is usually used for the hydrogenation from 0.001 mol. to 0.05 mol. of catalyst per 100 g of vinyl-polybutadiene.

The hydrogenation is carried out at temperatures of approximately from 50 to 120° C. at a hydrogenation pressure of approximately from 1 atm to 100 atm.

The hydrogenated polymers are worked up in the usual manner by first separating off the hydrogenation catalysts in a suitable manner and isolating the hydrogenated product by removing the solvent used.

In a preferred form, the hydrogenation catalyst—in the present case nickel salt in combination with an aluminum alkyl—is removed from the hydrogenation solution by treating the hydrogenation solution with a suitable complexing agent and an oxidizing agent. The nickel formed in the hydrogenation of the vinyl-polybutadiene is thereby oxidized and brought into a soluble form with the complexing agent. The resulting nickel complex is then washed out of the hydrogenation solution with water.

In a preferred form, the nickel is removed from the hydrogenation solution by a stripping process. In that process, a complexing agent is added to the hydrogenation solution, which is stripped under oxidative conditions using steam.

Suitable complexing agents for the resulting nickel are nitrilotriacetic acid, ethylenediaminetetraacetic acid, oxalic acid and/or citric acid, preferably citric acid. The amount of complexing agents is approximately from 0.01 g to 3 g, based on 100 g of polymer.

The amount of nickel that remains in the polymer is dependent inter alia on the amount of catalyst used, the concentration of the polymer solution, the oxidizing agent and the nature and amount of the complexing agent.

Both air and pure oxygen may be used as oxidizing agent.

It may be advantageous to add appropriate additives, such as anti-aging agents or vulcanization aids or extender oils, to the polymer solution before it is worked up. The known additives are used in the amounts conventional therefore. The amount of additives is dependent on the subsequent intended use of the resulting hydrogenated vinyl-polybutadienes.

When the polymer solution has been stripped with steam or washed with water, a dispersion of crumbs of rubber in water is obtained. The resulting crumbs of rubber are washed, then separated from the water and subsequently dried in suitable apparatuses to a moisture content of approximately from 1 to 5 wt. %.

It is, of course, possible to blend the resulting hydrogenated vinyl-polybutadienes with other rubbers, for example with natural rubber as well as with known synthetic rubbers, such as polybutadiene (BR); styrene/butadiene rubber (SBR), butyl rubber (IIR), ethylene/propylene rubber (EPM and EPDM), hydrogenated nitrile rubber (HNBR), polychloroprene (CR), nitrile rubber (NBR); ethylene/vinyl acetate copolymers (BVM) and chlorinated or chlorosulfonated polyethylene (CM and CSM).

The mixing ratio of the rubbers with one another can readily be determined by preliminary tests and is dependent on the subsequent intended use of the hydrogenated vinyl-polybutadienes according to the invention.

The present invention relates also to the use of the hydrogenated vinyl-polybutadienes according to the present invention having the above-described physical properties and the above-mentioned microstructure in the production of molded bodies of any kind, especially in the production of tires and tire components, such as tire treads and the side walls of tires. Moreover, industrial rubber articles, e.g. hoses and sealing rings, can also be produced from the elastic hydrogenated vinyl-polybutadienes according to the present invention.

The hydrogenated vinyl-polybutadienes according to the present invention can also be blended with thermoplastics or duroplastics in order, for example, to increase the impact strength of such polymers. There may be used as thermoplastics for that purpose, for example: styrene/acrylonitrile copolymers, polybutylene terephthalate, polyethylene terephthalate; polyoxymethylene, polystyrene, polycarbonate and polyvinyl chloride. The following duroplastics can be used: unsaturated polyester resins, epoxy resins as well as phenol/formalde-hyde and also melamine/formaldehyde resins.

The mixing ratio of the thermoplastics to the hydrogenated vinyl-polybutadienes that are used is likewise dependent on the subsequent intended use of the thermoplastics. It can therefore readily be determined by appropriate preliminary tests.

EXAMPLES

Preparation of Vinyl-Polybutadienes as Starting Materials for the Hydrogenation

The polymerization of butadiene is carried out using n-butyllithium as the polymerization catalyst and cyclohexane as the solvent. The vinyl contents are adjusted by adding tetramethylethylenediamine (TMEDA) and tert.-butoxyethoxyethane (BEE) and by varying the polymerization temperature. The variations made and the effect on the vinyl content are summarized in Table 2 (TMEDA) and Table 3 (BEE).

The polymerizations were carried out in a 1.7-litre steel reactor. To that end, the empty reactor was filled to $\frac{2}{3}$ with dry cyclohexane, under protecting gas. Butadiene was then metered in and a butadiene concentration of from 12 to 13 wt. % in cyclohexane was established. The randomizer TMEDA or BEE was then added, the vinyl content being controlled by varying the molar ratio of randomizer/BuLi (see Tables 2 and 3). After addition of the randomizer, BuLi was added in a concentration of from 1 to 2 mmol. Li to 100 g of monomer (see Table 2). The polymerization was carried out at 30° C. and at 60° C. After 120 minutes in each case, the polymerizations were stopped by addition of a 2.5% solution of 2,2'-methylene-bis-(4-methyl-6-tert.-butyl)phenol (BKF) in ethanol. The amount of stopping agent was from 50 to 70 g of the 2.5% BFK solution per 100 g of monomer. Vinyl-polybutadiene was isolated from the solution by precipitation with ethanol and was dried to constant weight at 50° C. in a vacuum drying cabinet.

The vinyl content, the degree of hydrogenation and the remaining microstructure were determined by means of $^1$H-NMR spectroscopy in $CDCl_3$.

In order to determine the glass transition temperature (Tg), the polymer samples were characterized by DSC measurements. All the data are summarized in Tables 1 and 2.

As will be seen from Tables 1 and 2, the vinyl content is dependent on the polymerization temperature and on the molar ratio Bu-Li/TMEDA (Table 1) as well as on the molar ratio BuLi/BEE (Table 2).

TABLE 1

Preparation and properties of polybutadienes having different vinyl contents (randomizer: TMEDA)

| Test No. | BuLi[a] [mmol./ 100 g monomer] | TMEDA [mol./ mol. BuLi] | Temperature[b] [° C.] | Vinyl content[c] [%] | Tg (DSC)[d] [° C.] | Hydrogenation |
|---|---|---|---|---|---|---|
| STER 461 | 1 | 0.25 | 30 | 30 | −89 | Tab. 3 |
| STER 463 | 1 | 0.5 | 60 | 45 | −77 | Tab. 4 |

TABLE 1-continued

Preparation and properties of polybutadienes having
different vinyl contents (randomizer: TMEDA)

| Test No. | BuLi[a) [mmol./ 100 g monomer] | TMEDA [mol./ mol. BuLi] | Temperature[b) [° C.] | Vinyl content[c) [%] | Tg (DSC)[d) [° C.] | Hydrogenation |
|---|---|---|---|---|---|---|
| Buna[e) | | | | 54 | −60.5 | Tab. 5 |
| STER 471 | 1 | 0.5 | 30 | 62 | −57 | Tab. 6 |
| STER 452 | 1 | 1 | 60 | 71 | −50 | Tab. 7 |

[a)]BuLi is the polymerization catalyst.
[b)]Polymerization temperature.
[c)]The vinyl content is determined by $^1$H-NMR.
[d)]Tg (DSC) is the glass transition temperature determined by DSC.
[e)]Buna ® VI 19 49 from Bayer Elastomères.

TABLE 2

Preparation and properties of polybutadiene having
different vinyl contents (randomizer: BEE)

| Test No. | Solids content [wt. %] | BuLi[a) [mmol./ 100 g butadiene] | BEE [mol./mol. BuLi] | Temperature[b) [° C.] | Vinyl content[c) [%] | Tg (DSC)[d) [° C.] | ML 1 + 4/100° C. Mooney units |
|---|---|---|---|---|---|---|---|
| STER 941 | 12 | 1.5 | 1:1.7 | 60 | 75 | −43 | 12.2 |
| STER 944 | 12 | 1.5 | 1:3.3 | 60 | 71 | −46 | 4.4 |
| STER 956* | 12 | 1.25 | 1:1 | 60 | 64 | −60 | 19.7 |
| STER 958* | 12 | 1 | 1:1 | 60 | 48 | −77.5 | 18.3 |
| STER 970 | 22 | 1 | 1:0.5 | 60 | 39 | −84.5 | 30 |
| STER 769* | 12 | 1.5 | 1:1 | 60 | 41 | −82.5 | 3.6 |

*examples according to the present invention.

Hydrogenation of the Vinyl-Polybutadienes

The hydrogenation of vinyl-polybutadiene was carried out using a hydrogenation catalyst based on Ni octanoate [Ni(Oct)$_2$] and triethylaluminium (TEA). The molar ratio of TEA: Ni(Oct)$_2$ or of Al:Ni was kept constant (Al:Ni=3.3:1). Nickel was used in a molar ratio of 0.2 mol. to 100 mol. double bonds. Pre-forming of the hydrogenation catalyst of Ni(Oct)$_2$ and TEA was carried out in a 25 ml Schlenk flask under argon. For that purpose, the Schlenk flask was filled with 2–5 ml of dried cyclohexane, and then 0.7–1.0 ml of TEA was added (according to the amount of polymer present in the reactor). A 10% solution of Ni(Oct)$_2$ in cyclohexane was added dropwise at about 15° C., with stirring and cooling. The catalyst solution was freshly prepared each time and was used immediately after preparation.

For the hydrogenations described in Tables 3 to 7, the vinyl-polybutadiene was isolated from the solution, as described hereinabove, when the polymerization was complete, an aliquot portion was characterized and the residual amount of the vinyl-polybutadiene was dissolved in cyclohexane and hydrogenated. For the hydrogenation, a 12% polymer solution in cyclohexane was prepared and heated to 50° C. The heterogeneous dispersion of the catalyst was added to the hydrogenation reactor at 50° C., with stirring, immediately after preparation. A hydrogen pressure was then applied stepwise to the reactor (from below 5 to not more than 6.5 bar). The hydrogenation reaction took place immediately, visible by the fall in the hydrogen pressure and the rise in temperature in the reactor. The samples for determination of the degree of hydrogenation were discharged from the reactor in dependence on the hydrogenation time. The hydrogen pressure fell thereby by 1.2 bar in each case.

As described in the preparation of vinyl-polybutadiene samples, a solution of Vulkanox BKF is added to the samples, which are then precipitated with ethanol, dried and characterized.

After about 2 hours, the hydrogenation was complete, recognizable from the fact that the polymer solution did not take up any more hydrogen. The reactor was relieved to normal pressure, the hydrogen, diluted with nitrogen (H$_2$:N$_2$=1:10), slowly being discharged into the waste air. The residual hydrogen remaining in the reactor and in the polymer solution was removed by passing in argon to a pressure of 3 bar and subsequently relieving the pressure, the procedure being repeated three times.

The hydrogenated samples were coagulated in an ethanol:water mixture (ethanol:water=10:1) and dried to constant weight in a vacuum drying cabinet at 50° C.

The degrees of hydrogenation were determined by means of $^1$H-NMR. In addition to the degrees of hydrogenation, the samples were also characterized by means of DSC in order to determine glass transition temperatures (Tg), melting temperatures (Tm) and enthalpies of fusion (ΔH).

The test parameters and the properties of the fully and partially hydrogenated samples are summarized in Tables 3 to 7.

TABLE 3

Properties of hydrogenated vinyl-BR having a
vinyl content of 30% (STER 461).

| No. | Ni[a) [mol./100 Dpp] | Al:Ni [molar] | Degree of hydrogenation[e) [%] | Tg[f) [° C.] | Tm [° C.] | ΔH [J/g] |
|---|---|---|---|---|---|---|
| 3.1 | 0.2 | 3.3:1 | 20 | −86.5 | 40.5 | 4.4 |
| 3.2 | 0.2 | 3.3:1 | 35.3 | −87 | 47.5 | 14.9 |

TABLE 3-continued

Properties of hydrogenated vinyl-BR having a vinyl content of 30% (STER 461).

| No. | Ni[a] [mol./100 Dpp] | Al:Ni [molar] | Degree of hydrogenation[e] [%] | $T_g^{[f]}$ [° C.] | $T_m$ [° C.] | $\Delta H$ [J/g] |
|---|---|---|---|---|---|---|
| 3.3 | 0.2 | 3.3:1 | 60 | −83.5 | 50.2 | 41.6 |
| 3.4 | 0.2 | 3.3:1 | 87.5 | −59.5 | 58.2 | 48.1 |
| 3.5 | 0.2 | 3.3:1 | 100 | −48 | 63.7 | 53 |

TABLE 4

Properties of hydrogenated vinyl-BR having a vinyl content of 45% (STER 463).

| No. | Ni[a] [mol./100 Dpp] | Al:Ni [molar] | Degree of hydrogenation[e] [%] | $T_g^{[f]}$ [° C.] | $T_m$ [° C.] | $\Delta H$ [J/g] |
|---|---|---|---|---|---|---|
| 4.1 | 0.2 | 3.3:1 | 11.76 | −76 | — | 0 |
| 4.2 | 0.2 | 3.3:1 | 18.4 | −75.5 | — | 0 |
| 4.3* | 0.2 | 3.3:1 | 26.4 | −76 | 5 | 1.5 |
| 4.4* | 0.2 | 3.3:1 | 34.2 | −76 | 8 | 1.9 |
| 4.5* | 0.2 | 3.3:1 | 43.2 | −76 | 9.5 | 5.7 |
| 4.6* | 0.2 | 3.3:1 | 52.9 | −75.5 | 10.5 | 10.5 |
| 4.7* | 0.2 | 3.3:1 | 66.2 | −73.5 | 12.5 | 15.2 |
| 4.8* | 0.2 | 3.3:1 | 79.9 | −69.5 | 18.5 | 21.9 |
| 4.9* | 0.2 | 3.3:1 | 95.6 | −62 | 23.7 | 30.1 |
| 4.10* | 0.2 | 3.3:1 | 100 | −61.5 | 23.7 | 26.6 |

*examples according to the present invention

TABLE 5

Properties of hydrogenated vinyl-BR having a vinyl content of 54% (Buna VI 1949).

| No. | Ni[a] [mol./100 Dpp] | Al:Ni [molar] | Degree of hydrogenation[e] [%] | $T_g^{[f]}$ [° C.] | $T_m$ [° C.] | $\Delta H$ [J/g] |
|---|---|---|---|---|---|---|
| 5.1 | 0.2 | 3.3:1 | 16 | −61 | — | 0 |
| 5.2* | 0.2 | 3.3:1 | 20.8 | −61.5 | — | 0 |
| 5.3* | 0.2 | 3.3:1 | 29.2 | −62.5 | — | 0 |
| 5.4* | 0.2 | 3.3:1 | 41.7 | −63 | — | 0 |
| 5.5* | 0.2 | 3.3:1 | 52 | −63 | — | 0.5 |
| 5.6* | 0.2 | 3.3:1 | 63.5 | −63.5 | 83.4 | 1.5 |
| 5.7* | 0.2 | 3.3:1 | 79.2 | −64 | 86 | 3.5 |
| 5.8* | 0.2 | 3.3:1 | 92.7 | −64 | 89.8 | 3.0 |
| 5.9* | 0.2 | 3.3:1 | 100 | −62 | 90.7 | 4.0 |

*examples according to the present invention

TABLE 6

Properties of hydrogenated Vi-BR having a vinyl content of 62% (STER 471).

| No. | Ni[a] [mol./100 Dpp] | Al:Ni [molar] | Degree of hydrogenation[e] [%] | $T_g^{[f]}$ [° C.] | $T_m$ [° C.] | $\Delta H$ [J/g] |
|---|---|---|---|---|---|---|
| 6.1 | 0.2 | 3.3:1 | 4.5 | −55 | — | — |
| 6.2 | 0.2 | 3.3:1 | 13.6 | −56 | — | — |
| 6.3 | 0.2 | 3.3:1 | 18.2 | −56.5 | — | — |
| 6.4* | 0.2 | 3.3:1 | 25 | −57 | — | — |
| 6.5* | 0.2 | 3.3:1 | 34.1 | −58.5 | — | — |
| 6.6* | 0.2 | 3.3:1 | 52.3 | −61.5 | — | — |
| 6.7* | 0.2 | 3.3:1 | 60 | −62 | — | — |
| 6.8* | 0.2 | 3.3:1 | 81.8 | −62.5 | 29.2 | 9 |
| 6.9* | 0.2 | 3.3:1 | 98 | −63 | 25.7 | 13 |
| 6.10* | 0.2 | 3.3:1 | 100 | −61 | 36.4 | 15 |

*examples according to the present invention

TABLE 7

Properties of vinyl-BR having a vinyl content of 71% (STER 452).

| No. | Ni[a] [mol./100 Dpp] | Al:Ni [molar] | Degree of hydrogenation[e] [%] | $T_g^{[f]}$ [° C.] | $T_m$ [° C.] | $\Delta H$ [J/g] |
|---|---|---|---|---|---|---|
| 7.1 | 0.2 | 3.3:1 | 17.9 | −49.5 | — | 0 |
| 7.2 | 0.2 | 3.3:1 | 22.32 | −49.5 | — | 0 |
| 7.3 | 0.2 | 3.3:1 | 30.8 | −50.5 | — | 0 |
| 7.4 | 0.2 | 3.3:1 | 40.2 | −54 | — | 0 |
| 7.5 | 0.2 | 3.3:1 | 49.6 | −53.5 | — | 0 |
| 7.6 | 0.2 | 3.3:1 | 62.5 | −56 | — | 0 |
| 7.7 | 0.2 | 3.3:1 | 71.9 | −57 | — | 9 |
| 7.8 | 0.2 | 3.3:1 | 83.5 | −49.5 | — | 15 |
| 7.9 | 0.2 | 3.3:1 | 100 | −48.5 | — | 13 |

In the tests described in Tables 8 and 9, only an aliquot portion of the vinyl-polybutadiene was worked up for the determination of analytical data. The majority of the polymer solution remained in the reactor and the hydrogenation was carried out in situ in the same reactor, without isolation of the vinyl-polybutadiene, immediately following the polymerization.

TABLE 8

Preparation and properties of polybutadiene having different vinyl contents (randomizer: BEE) with subsequent in situ hydrogenation (Table 9)

| Test No. | Solids content [wt. %] | BuLi[a] [mmol./100 g butadiene] | BEE [mol./mol. BuLi] | Temperature [° C.] | Vinyl content [%] | Tg (DSC) [° C.] | ML 1 + 4/100° C. Mooney units | Hydrogenation |
|---|---|---|---|---|---|---|---|---|
| STER 772 | 12 | 1.5 | 1:2 | 60 | 76 | −52.5 | 5.3 | Tab. 9 |
| STER 773 | 18 | 1.25 | 1:1 | 60 | 35 | −64.5 | | Tab. 9 |
| STER 774 | 20 | 1.25 | 1:1 | 60 | 32 | −67.5 | | Tab. 9 |
| STER 776 | 20 | 0.75 | 1:1 | 60 | 48 | −63 | 18.3 | Tab. 9 |

TABLE 8-continued

Preparation and properties of polybutadiene having different vinyl contents (randomizer: BEE) with subsequent in situ hydrogenation (Table 9)

| Test No. | Solids content [wt. %] | BuLi[a] [mmol./ 100 g butadiene] | BEE [mol./mol. BuLi] | Temperature [° C.] | Vinyl content [%] | Tg (DSC) [° C.] | ML 1 + 4/100° C. Mooney units | Hydrogenation |
|---|---|---|---|---|---|---|---|---|
| STER 777 | 20 | 0.8 | 1:1 | 60 | 75 | −55.5 | 17 | Tab.9 |
| STER 778 | 20 | 1 | 1:1 | 60 | 72 | −58 | 9.3 | Tab. 9 |

TABLE 9

In situ hydrogenation of the vinyl-polybutadiene samples prepared in Table 8

| Test No. STER | Amount of Ni mol./100 mol. DB | Pre-forming of the hydrogenation catalyst | Time [h] | Degree of hydrogenation [mol. %] | ML 1 + 4/100° C. ML1 + 4/ 100° C. | Tg (DSC) [° C.] | ΔH [J/g] |
|---|---|---|---|---|---|---|---|
| 772 | 0.02 | yes[a] | 4 | 69.4 | 5.2 | −52.5 | — |
| 773* | 0.02 | yes[a] | 3 h 15' | 67.8 | 12.3 | −64.5 | — |
| 774* | 0.02 | yes[a] | 6 h 30' | 60.7 | 11 | −67.5 | — |
| 776* | 0.02 | no[b] | 4 h 15' | 60 | 29.2 | −63 | — |
| 777* | 0.2 | yes[a] | 2 | 71.1 | 56.6 | −55.5 | — |
| 778* | 0.2 | no[c] | 3 | 67.03 | 14.0 | −58 | — |

*examples according to the present invention
[a]Catalyst pre-forming is carried out in a separate Schlenk flask. TEA is placed in the flask in cyclohexane as a 5 M solution, then Ni(Oct)$_2$ is added dropwise in the course of ½ hour. The pre-formed catalyst is then added to the hydrogenation reactor.
[b]The hydrogenation catalyst is prepared in the hydrogenation reactor without separate pre-forming. For that purpose, the catalyst components TEA, Ni(Oct)$_2$ are added directly to the hydrogenation reactor stepwise, in each case after 10 minutes.
[c]The hydrogenation catalyst is prepared in the hydrogenation reactor. First TEA and then Ni(Oct)$_2$ are added. After the addition of Ni(Oct)$_2$, stirring is carried out for one hour prior to the addition of hydrogen.

TABLE 10

EPM and EPDM commercial products of Bayer AG

| Product names | Mooney ML (1 + 4/ 125° C.) [Mooney units] | ENB content [wt.%] | Ethene content [wt.%] | Tg (DSC) [° C.] | ΔH [J/g] |
|---|---|---|---|---|---|
| Buna EPT 2070 | 22 | 0 | 68 | −47.5 | 39.2 |
| Buna EPT 2370 | 16 | 3 | 71 | −39.5 | 51.8 |
| Buna EPT 2450 | 22 | 4 | 59 | −52.5 | 17.8 |
| Buna EPG 2470 | 24 | 4 | 69 | −42.0 | 41.2 |
| Buna EPG 3440 | 28 | 4 | 48 | −56.5 | — |
| Buna EPG 5450 | 46 | 4 | 52 | −56.0 | 2.0 |
| Buna EPG 6170 | 59 | 1.5 | 72 | −43.5 | 48.7 |
| Buna EPG 6470 | 57 | 4 | 68 | −41.0 | 37.3 |
| Buna EPG 6850 | 60 | 8 | 53 | −52.5 | — |
| Buna EPG 6950 | 60 | 9 | 52 | −50.0 | 2.0 |
| Buna EPG 8450 | 76 | 4 | 53 | −56.0 | 2.0 |
| Buna EPG 9650 | 87 | 6 | 53 | −53.5 | — |
| Buna EPT 9650 | 94 | 6.5 | 53 | −52.5 | 7.0 |
| Buna EPG 3850 | 28 | 8 | 48 | −50.0 | — |
| Buna EPT 3950 | 33 | 11 | 56 | −44.5 | 10.4 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Hydrogenated vinyl-polybutadiene polymer having degrees of hydrogenation of from 20 to 100%, Mooney viscosities in the range of from 10 to 150 Mooney units (ML 1+4/100° C.), glass transition temperatures ($T_g$) of $\leq -57°$ C. number average molecular weight between 60,000 and 500,000 and enthalpies of fusion ($\Delta H$) of $\leq 30$ J/g and comprising a) from 0 to 44 wt. % 1,2-vinyl-butadiene units of the formula

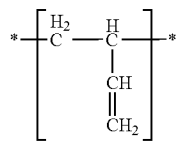

b) from 20 to 64 wt. % 1,2-butylene units of the formula

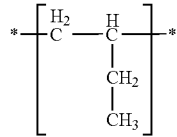

c) from 0 to 60 wt. % 1,4-butenylene units of the formula

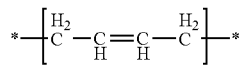

and d) from 0 to 60 wt. % 1,4-butylene units of the formula

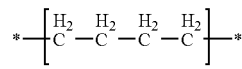

wherein the hydrogenated vinyl-polybutadiene does not include solid polybutadiene which is subsequently hydrogenated and has a trans content of 4.7%, a vinyl content of 0.2%, a Mooney viscosity ML 1+4 of 27 and a molecular weight ratio $M_w/M_n \times 10^{-3}$ of 291/96.

2. A process for the preparation of the hydrogenated vinyl-polybutadiene polymer(s) according to claim 1, comprising hydrogenating vinyl-polybutadienes having a vinyl content of from 46 to 64 wt. % and a content of 1,4-butenyl of from 36 to 60 wt. % in a hydrogenation solution to a degree of hydrogenation of from 20 to 100% in the presence of hydrogenation catalysts, then washing the hydrogenation solution water, separating the precipitated polymer from the solvent and water and drying the polymer to a moisture content of from 1 to 5 wt. %.

3. The process according to claim 2 wherein the hydrogenation is carried out in the presence of a catalyst comprising nickel salt in combination with an aluminum alkyl compound, wherein the molar ratio of aluminum alkyl compound to nickel salt is from 1:1 to 10:1 and the amount of catalyst is from 0.001 to 0.05 mol./100 g of vinyl-polybutadiene, and wherein after the hydrogenation the catalyst is treated with the hydrogenation solution under oxidizing conditions with a suitable complexing agent for the nickel that forms and the nickel is removed from the hydrogenation solution in a stripping process by treatment with steam.

4. A molded body comprising a hydrogenated vinyl-polybutadiene polymer according to claim 1.

5. A molded body according to claim 4, wherein the molded body is a tire or a tire component.

* * * * *